Dec. 20, 1966  W. B. VAN NEST  3,292,581
METHOD AND APPARATUS FOR TRANSPORTING TURKEY
Filed Oct. 7, 1964  5 Sheets-Sheet 1
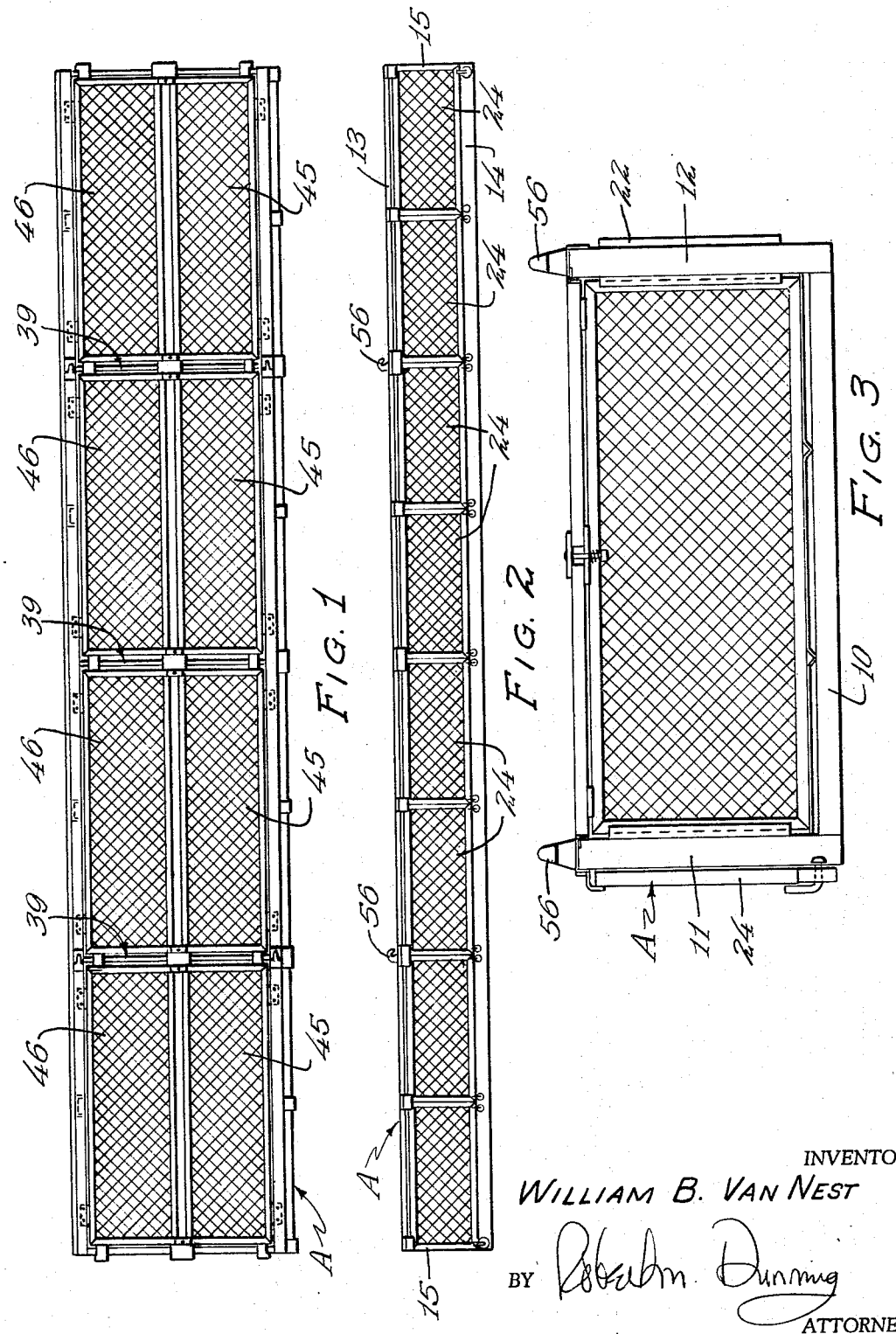
INVENTOR
WILLIAM B. VAN NEST
BY
ATTORNEY

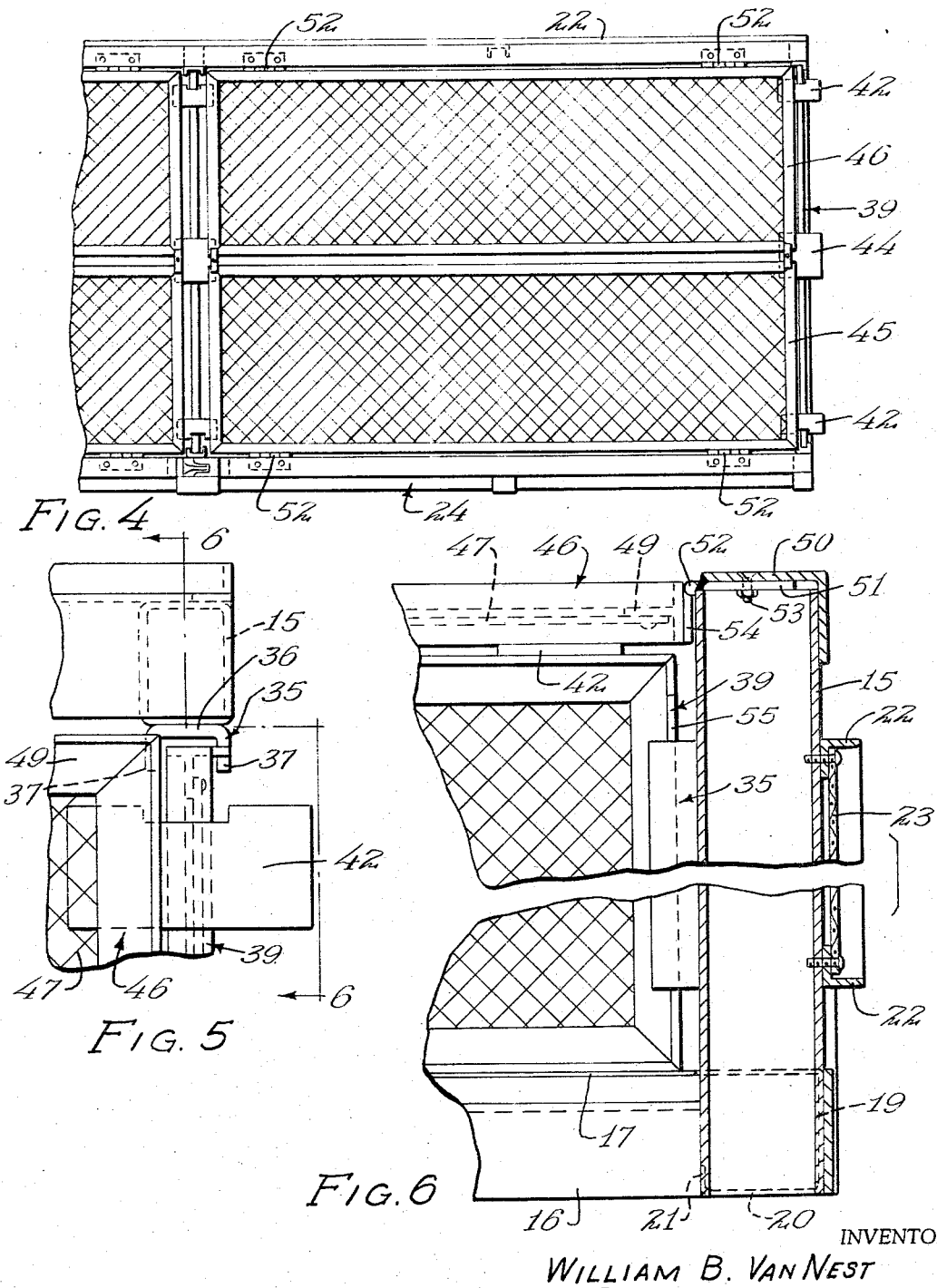

Dec. 20, 1966 W. B. VAN NEST 3,292,581
METHOD AND APPARATUS FOR TRANSPORTING TURKEY
Filed Oct. 7, 1964 5 Sheets-Sheet 3

INVENTOR
WILLIAM B. VAN NEST
BY
ATTORNEY

Dec. 20, 1966 W. B. VAN NEST 3,292,581
METHOD AND APPARATUS FOR TRANSPORTING TURKEY
Filed Oct. 7, 1964 5 Sheets-Sheet 4

INVENTOR
WILLIAM B. VAN NEST
BY Robert M. Dunning
ATTORNEY

Dec. 20, 1966 W. B. VAN NEST 3,292,581
METHOD AND APPARATUS FOR TRANSPORTING TURKEY
Filed Oct. 7, 1964 5 Sheets-Sheet 5
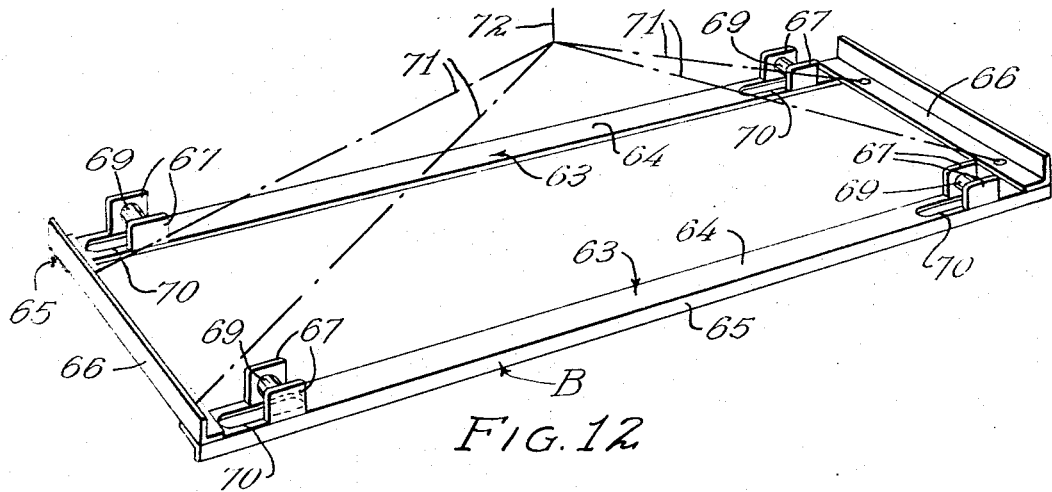
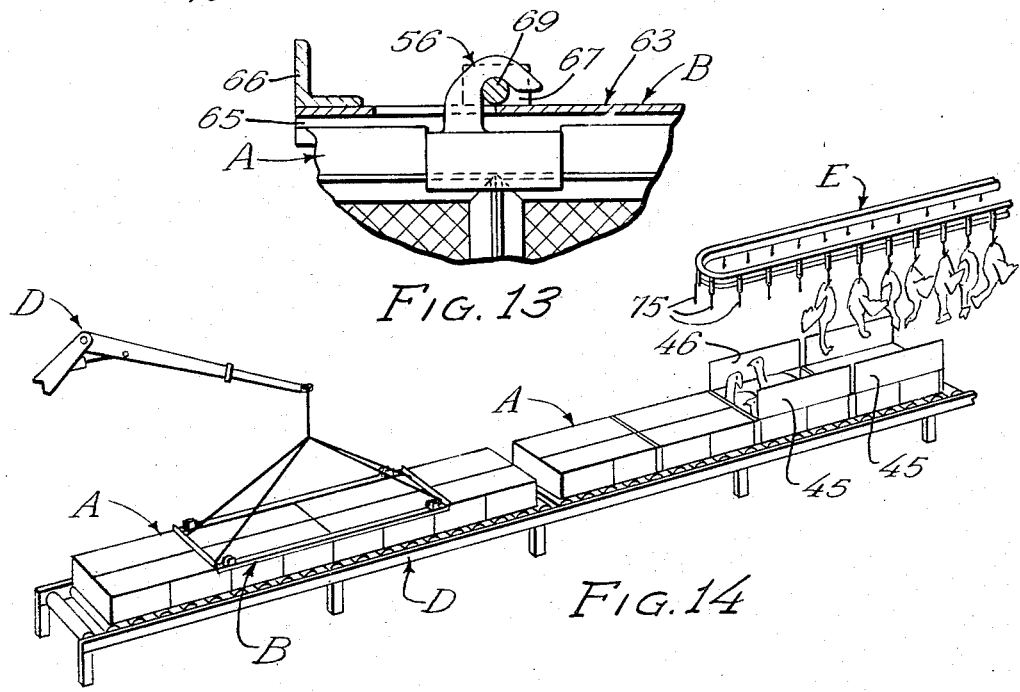
INVENTOR
WILLIAM B. VAN NEST
BY
ATTORNEY

United States Patent Office 3,292,581
Patented Dec. 20, 1966

3,292,581
METHOD AND APPARATUS FOR
TRANSPORTING TURKEY
William B. Van Nest, Box 2752, Rte. 2,
Excelsior, Minn. 55331
Filed Oct. 7, 1964, Ser. No. 402,107
7 Claims. (Cl. 119—17)

This invention relates to an improvement in method and apparatus for transporting poultry and deals particularly with elongated containers into which the turkeys may be herded, and which may be stacked one upon the other on a flat truck bed for transportation to the processing plant. The invention also embodies the method of handling the containers so that the time consumed in loading and unloading the trucks as well as the hand power required for this procedure may be greatly reduced.

Turkeys are usually transported from the turkey farms to the processing plant in trucks having bodies of special design. Trucks for this purpose have been produced with a series of superimposed compartments into which the turkeys are placed, the individual compartments sometimes being provided with separate doors through which the turkeys may be inserted and removed. As the live turkeys are naturally adverse to being caught and handled, considerable time is consumed in carrying out this task. Furthermore, as the trucks must be loaded as quickly as possible so that the turkeys will not remain confined in the compartments any longer than is necessary, a crew of considerable size is required to complete the task within a reasonable time. Furthermore, as the compartments are often of considerable size, the movement of the truck has a tendency to crowd the turkeys closely together causing physical injury to some of them during transportation and reducing their value correspondingly. Much difficulty is also experienced in removing the birds from the truck when it reaches its destination, for after a portion of the turkeys have been unloaded, the remaining turkeys do their best to elude the hands of those attempting to unload them.

It has been found that the time required to load a truck of turkeys, as well as the crew required to accomplish the task may be materially reduced by providing a series of individual pens which may be loaded with turkeys while resting on the ground, and which may then be stacked in superimposed relation upon a flat truck bed. By providing these pens with an elongated body of U-shaped section, and closing one end of the compartment thus formed, the turkeys may be herded into the enclosure through the open end until the compartment is full. This operation is greatly facilitated by providing hinged cover panels on the opposites of the channel shaped enclosure which may be swung up to form extensions of the side walls during the operation. With such an arrangement, the turkeys may be herded to the closed end of the compartment until the compartment is full, whereupon the formerly open end may be closed.

A further feature of the present invention lies in the fact that with this arrangement the length of the compartment may be divided into relatively small sections through the use of partition members slidably supported to extend between the spaced side walls. With this arrangement, after a predetermined number of turkeys have been herded into the closed end of the compartment, a partition may be slid into place to confine the birds in this end area. When another predetermined number of birds have been herded into the area adjoining the first partition, a second partition may be inserted to confine these birds into a second smaller compartment. This procedure is followed until the compartment is filled with a predetermined number of birds in each section of the compartment. The hinged covers may then be folded down to form the top of the compartment, and the compartment may be lifted on to a truck bed.

In the preferred form of construction, the truck is provided with a lift crane which may lift the compartments into position one upon the other, the truck bed normally accommodating two side by side rows of compartments. Means are provided for engaging the compartments, preferably at four spaced points to facilitate the loading operation. The compartments are preferably provided with projecting hooks which are detachably engageable with the lifting means. When the compartments are placed one upon the other, the upwardly projecting hooks of a lower compartment are designed to extened into suitable sockets in the bottom of the next above compartment to interlock the superimposed compartments together. Thus the superimposed form, in effect, is a single connected mass when the load is complete.

A further feature of the present invention lies in the provision of doors in the sides of the compartments through which the turkeys may be removed if desired. This arrangement may be used if the processing plant is provided with an enclosure or pen where the turkeys may move about prior to the time they are processed. However, the structure is such that each compartment may be placed upon a conveyor and moved into position below a movable conveyor having depending hooks such as are commonly used in processing plants. By opening the top closure doors of each compartment, the turkeys may be removed one at a time and hung on the conveyor at which time they are electrocuted just prior to the processing operation.

These and other objects and novel features of the present invention will be more clearly and fully set forth in the following specification and claims:

FIGURE 1 is a top plan view of a compartment showing the general arrangement thereof.

FIGURE 2 is a side elevational view of the structure shown in FIGURE 1.

FIGURE 3 is an end view of the structure shown in FIGURES 1 and 2 in enlarged form.

FIGURE 4 is an enlarged top plan view of an end section of the compartment.

FIGURE 5 is a plan view of one end corner of the compartment.

FIGURE 6 is an end view of the corner, the position of the view being indicated by the line 6—6 of FIGURE 5.

FIGURE 12 is a perspective view illustrating the frame used for lifting the compartments.

FIGURE 13 is a section of detail showing the manner in which the compartments may be connected to the lifting frame.

FIGURE 14 is a diagrammatic perspective view showing the unloading operation.

In the following description, the specific detail of construction is in many instances unimportant. In other words, the specific manner in which the various panels forming the compartment are fabricated may be varied in general, the various panels which are movable such as the partition panels, the hinged top panels, and the removable side panels comprise rectangular frames of T-bar or angle iron construction which support rectangular panels of expanded metal. The body comprises a frame of rectangular tubing which provides a rigid body structure.

Figure 8:
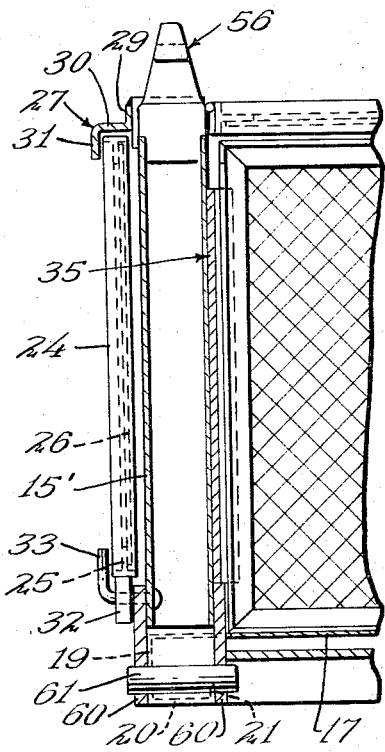
FIGURE 8 is a vertical sectional view through a portion of the structure, the position of the section being indicated by the line 8—8 of FIGURE 7.

As indicated in FIGURE 3 of the drawings, each compartment A includes a rectangular bottom frame 10, a rectangular side frame 11 extending upwardly from one edge of the bottom 10, and a second upright wall frame 12 extending upwardly from the opposite parallel edge of the bottom frame 10. The side frames 11 and 12 include tubular top rails 13 and tubular bottom rails 14 connected by spaced vertically extending frame members such as 15. The bottom frame 10 includes transversely extending channels such as 16 which hold the side frames 11 and 12 in spaced parallel relation. As is indicated in FIGURES 6 and 8 of the drawings, the bottom of the compartment is formed by a horizontal panel 17 of sheet material which is bent downwardly at 19 to lie outwardly of the longitudinal bottom rails 14, bent horizontally as indicated at 20 to underlie the longitudinal bottom rails 14, and terminates in an upwardly extending flange 21 which lies inwardly of the longitudinal frame members.

One side frame 12 is closed by means of a normally non-removable side closure. A rectangular angle iron frame 22 is secured to the vertical end posts 15 to extend therebetween, and is similarly connected to the intermediate posts. The rectangular frame 22 supports a foraminous panel 23 of expanded metal or similar material which forms a side closure, but which is open to provide ventilation. The opposite side wall frame 11 is closed by a series of slidable closures 24 each of which comprises a rectangular frame of T-shaped cross section with the cross member of the T forming the outer periphery of the door, and the stem of the T directed inwardly. As indicated in FIGURES 5 and 8 of the drawings, the T-shaped frame 25 of each of the closures 24 supports a rectangular panel 26 of foraminous material such as expanded metal. To hold the removable closures 24 in place, the upper rail 13 supports a Z-shaped rail 27 having a vertical flange 29 welded or otherwise fixed to the top rail 13, a horizontal outwardly extending flange 30 at the lower edge of the vertical flange 29, and a downwardly extending terminal flange 31 at the outer edge of the horizontal flange 30. Obviously, the member 27 may also comprise an inverted channel-shaped member. The lower edges of the removable closures 24 are supported upon rollers 32 supported on L-shaped brackets 33 projecting outwardly from the vertical posts 15. After an end one of the removable closures has been removed, the remaining side closures may be moved back and forth to open any section of the compartment.

As indicated in FIGURES 1 and 2 of the drawings, the compartment is divided into a series of sections, four such sections being indicated in FIGURE 1. The re-removable closures 24 are shown as extending one-half the length of a section so as to confine the opening to a predetermined size and to thereby control the exit area from the sections. Locking means are provided, not illustrated in the drawings, for holding the removable side closures 24 in place.

Figure 9:
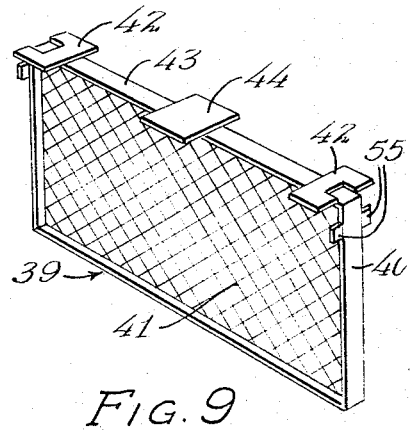
FIGURE 9 is a perspective view of one of the partitions.

With reference now to FIGURE 5 of the drawings, vertical channels 35 welded or otherwise secured to four of the vertical frame posts 15 with the base 36 of the channels welded or otherwise secured to the vertical posts, and the parallel flanges 37 extending inwardly in opposed relation. A partition unit 39 is slidably supported between each pair of channels 36. The partition members 39 form the ends of the compartments as well as the intermediate three partition walls. As indicated in FIGURE 9 of the drawings, each partition unit 39 includes a rectangular frame 40 of T-shaped cross section with a foraminous rectangular panel 41 of expanded metal or the like secured to the inwardly turned stem portion of the T. A pair of side bearing plates 42 are welded or otherwise secured to the upper surface of the upper frame member 43, and a central bearing plate 44 is secured intermediate the bearing plates 42. The bearing plates 42 and 43 extend to opposite sides of the partition 39, and are designed to form a support for the hinged cover panels, as will be later described.

As indicated in FIGURE 1 of the drawings, each compartment is provided with pairs of hinged top closures, the closures 45 being hinged to the side frame 11 and the opposed closures 46 being hinged to the frame side 12. Each of the closures 45 and 46 comprise rectangular frames of T-shaped cross section as indicated in FIGURE 6 of the drawings, and include a foraminous panel 47 of expanded metal of the like secured to the inwardly extending stem such as 49 of the T. Angle members 50 overlie the upper ends of the vertical posts 15 and are anchored thereto. The hinge straps 51 of the hinges 52 are secured by bolts 53 or other suitable means to the under surface of the angles 50, and the other hinge strap 54 of each pair is welded or otherwise secured to the frame of the top closure. When in lowered position, the top closures 45 and 46 rest upon the bearing plates 42 and 44 on the upper edges of the partitions 13. As is indicated in FIGURE 6, the channels 35 do not extend the full height of the partitions and laterally projecting stop lugs 55 limit the downward movement of the partitions to the proper level.

Figure 7:
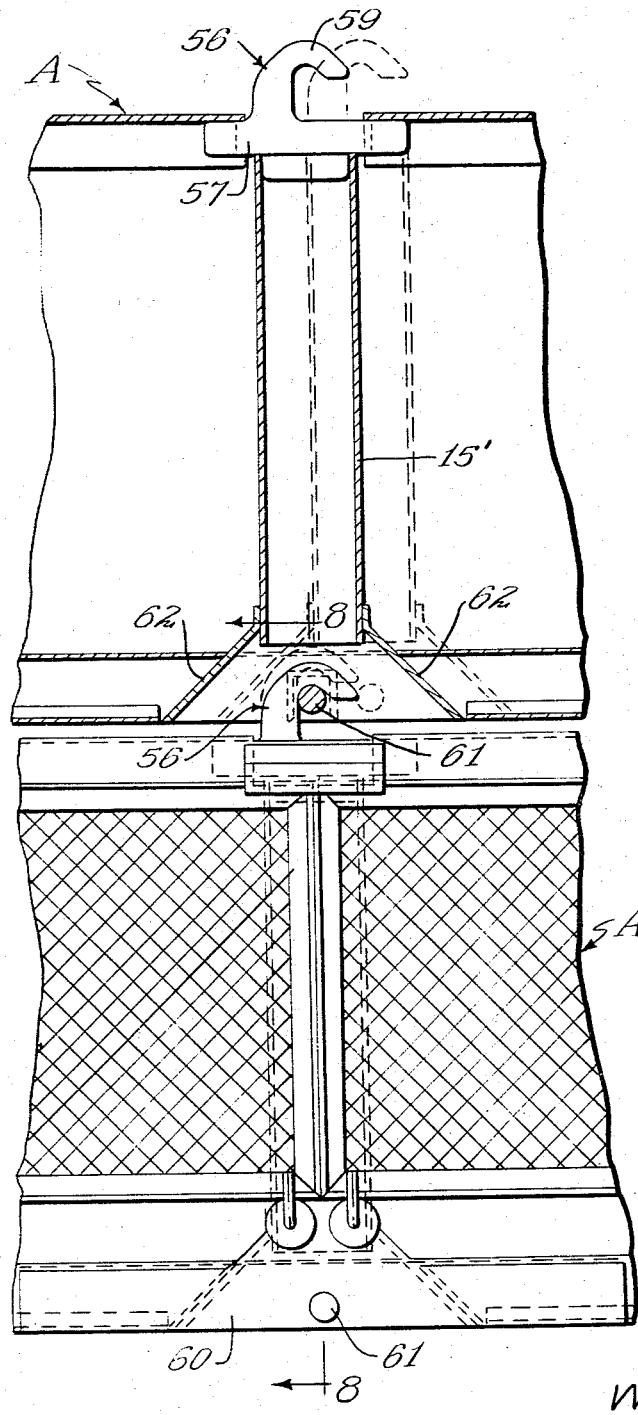
FIGURE 7 is a side elevational view, partly in section, of a portion of one of the sides of the compartments.

As is shown in FIGURES 7 and 8 of the drawings, the vertical posts 15' which support the channels 35 supporting the outer two of the inner partition walls support hook elements 56. The hook elements 56 include an elongated base 57 which is enclosed within the upper portion of the side walls and anchored thereto. Upwardly projecting hook ends 59 extend above the level of the compartments as is shown in these figures. A pair of downwardly and outwardly flaring gusset plates 60 are welded or otherwise secured to the lower ends of the posts 15'. Pins 61 extend between the gusset plates 60 and are secured thereto. Angularly inclined guide plates diverge outwardly from the lower ends of the posts 15', these guide plates being indicated at 62. The gusset plate 60 and guide plates 62 form a tapered chamber encircling the pin 61.

The hooks 56 and the pin 61 provide a means of interconnecting the superimposed compartments A. If the upper compartment A is lowered into the position illustrated in dotted outline in FIGURE 7 of the drawings, with the hook 56 offset from the pin 61 of the lower compartment, the pin may slide by the end of the hook. Then by sliding the upper compartment to the left as indicated in FIGURE 7 into the position shown in solid outline, the pin 61 may be engaged in the hooks 56. FIGURE 7 of the drawings shows the upper compartment A raised slightly above the lower compartment, as would be the case if both of the compartments were being lifted simultaneously. By interconnecting the various compartments, all of the superimposed compartments may be lifted at the same time in this manner if it is so desired.

The lifting frame used for lifting the compartments either in unison or singly is illustrated in FIGURE 12 of the drawings. This frame B is shown as comprising a pair of channels 63 ranged with their horizontal flanges 64 in a common plane, and their vertical flanges 65 on the outer edges of the horizontal flanges. The angles 63 are held in proper spaced relation by transversely extending angle braces 66. Pairs of ears 67 extend upwardly from the horizontal flanges 64 of the angles 63, and are connected by pins 69 which extend horizontally. The horizontal flanges 64 of the angles 63 are slotted as indicated 70 to accommodate the upwardly projecting hooks 56 of a compartment. The pins 69 are spaced a distance apart equal to the spacing of the pins 61 of the compartments A.

The lifting frame, when lowered over a compartment A may engage the hooks 56 in the same manner in which the hooks engage a superimposed compartment. The hooks extend through the slots 70 and are engaged over the pins 69. The vertical flanges 65 of the angles 63 are spaced to accommodate the top of the compartment therebetween.

The four corners of the frame B are connected by suitable cables 71 to a hoist line 72.

Figure 10:
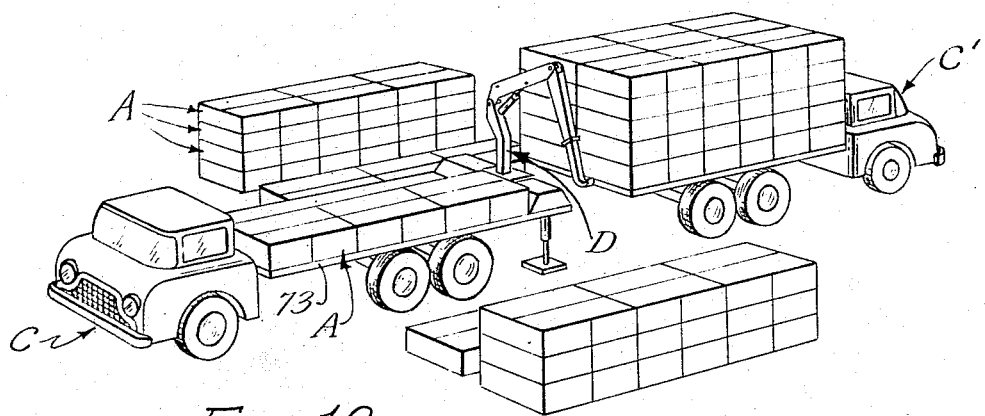
FIGURE 10 is a perspective diagrammatic view showing the manner in which the compartments may be loaded and unloaded.
Figure 11:
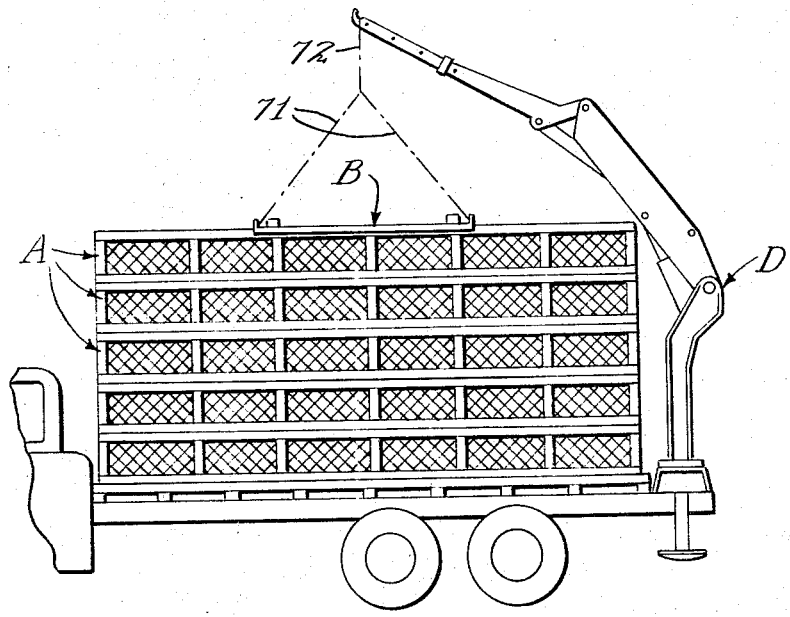
FIGURE 11 is a diagrammatic side elevational view of the loaded truck body.

FIGURE 10 of the drawings diagrammatically illustrates a truck C having a flat bed 73 which is of equal area to two side by side stacks of superimposed compartments A. The truck C is equipped with a hoist D to which the lifting frame B may be secured. The hoist D may lift each filled compartment A singly by sliding the uppermost compartment longitudinally a distance sufficiently to disengage the hooks 56 from the pins 61 and raising the compartments out of engagement with the lower compartments, swinging the compartments to one side and depositing the compartments in a selected position. The hoist D may also lift a series of superimposed compartments in the manner which has been described. Often the filled compartments are handled separately and the empty compartments are lifted back on to the truck body in unison.

FIGURE 10 also diagrammatically illustrates a second truck C′ similar to the truck C, but not including the hoist D. By backing the truck C′ up to the truck C, the compartments A on truck C′ may also be loaded and unloaded.

FIGURE 14 illustrates diagrammatically how the compartments A may be loaded. The compartments A are placed upon a conveyor D which extends beneath an elevated conveyor chain E supporting a series of downwardly extending hooks 75. When the leading end of the compartment A is beneath the chain conveyor E, the top closure panels 45 and 46 of the end section are opened and the turkeys removed therefrom one at a time and are suspended from the hooks 75 on the chain conveyor E. The turkeys are then processed in a continuous manner as is usual practice. By slowing advancing the compartment A, the second section of the compartment may be opened when the first is emptied, and the fowl in this section removed and placed upon the conveyor E. This process may continue until the compartment is emptied, whereupon the empty compartment may be cleaned and closed, and be delivered to position for stacking and return to the truck body.

When handled in the manner described, the removable side closures 24 may be replaced with a fixed side wall similar to the opposite side of the compartment. However, where the turkeys are not to be immediately processed, they are sometimes herded into a pen or other enclosure, and in some instances the side doors form a simple means of exit from the various sections. Alternatively, the turkeys may be herded from the enclosure by a process which is the reverse of the loading process. In other words, the top closures may be swung upwardly and the partitions may be sequentially removed to permit the turkeys of each section to leave the compartment one after the other.

In accordance with the Patent Statutes, the principles of construction and operation of this improvement in Method and Apparatus for Transporting Turkeys have been described, and while an endeavor has been made to set forth the best embodiments thereof, it should be understood that changes may be made within the scope of the following claims without departing from the spirit of the invention.

I claim:

1. A live turkey rack comprising:
   an elongated frame defining an elongated bottom wall and a pair of parallel foraminous side walls extending upwardly from opposite side edges thereof,
   a series of pairs of opposed guides on the inner surfaces of said side walls and substantially equally spaced throughout the length thereof,
   partition walls detachably supported by said guides of each pair, the end partition walls forming end closures,
   a pair of opposed cover panels hingedly connected in opposed relation to the side walls and foldable from end abutting relation to upright position between each partition wall and the next adjoining partition wall,
   a pair of hooks projecting upwardly from the side wall frames,
   the under surface of said side wall frames including sockets into which the hooks of a similar rack may extend, and
   means in said sockets engageable with said hooks to permit a plurality of superimposed racks to be lifted simultaneously.

2. A live turkey rack comprising:
   an elongated frame defining an elongated bottom wall and a pair of parallel foraminous side walls extending upwardly from opposite side edges thereof,
   a series of pairs of opposed guides on the inner surfaces of said side walls and substantially equally spaced throughout the length thereof,
   partition walls detachably supported by said guides of each pair, the end partition walls forming end closures,
   a pair of opposed cover panels hingedly connected in opposed relation to the side walls and foldable from end abutting relation to upright position between each partition wall and the next adjoining partition wall,
   two longitudinally spaced pairs of opposed hooks extending upwardly from said side wall frames,
   sockets in the lower surface of said side wall frames adapted to accommodate the upwardly projecting hooks of a similar rack, and
   means in said sockets engageable with the hooks of a similar rack whereby a plurality of superimposed racks may be lifted in unison.

3. The structure of claim 2 and including a lifting frame including a pair of connected frame sides having apertures therethrough through which said hooks may extend,
   means supported by said lifting frame sides above said apertures and with which said hooks are engageable, and
   means connected to lifting frame by means of which said lifting frame may be lifted.

4. A method of handling live turkeys through the use of a rack having an elongated bottom panel, foraminous side walls extending upwardly from opposite side edges thereof, removable end closures, and cover panels arranged in opposed pairs foldable from a position substantially parallel to the bottom panel to an upright position, and hinged to said side walls, the method consisting in the steps of:
   opening the cover panels into upwardly extending position,
   removing one end closure while having the other end closure in position,
   herding turkeys into the rack through the open end thereof,
   inserting the previously removed end closure to prevent the escape of the turkeys, and
   closing the top panels into substantially parallel relation to the bottom panel.

5. A method of handling live turkeys through the use of a series of compartment forming racks, each rack having an elongated bottom panel, side walls extending upwardly from opposite sides of said bottom panel, a series of removable parallel partition panels adapted to divide said rack into a series of sections of substantially equal size, and a series of pairs of opposed cover panels hinged to the upper edges of said side walls and swingable from substantially horizontal closed position above said bottom panel to an upright position, the cover panels of each pair being substantially equal to the length of one of said sections, the method including the steps of
- removing all but one partition panel closing an end of said rack,
- herding a predetermined number of turkeys into the area of the rack adjoining the closed end of the rack,
- inserting a first partition panel to form an end section containing a desired number of turkeys,
- closing the cover panels of said one section,
- herding turkeys toward the first partition inserted until there are a predetermined number in the next section and inserting a second partition,
- closing the cover panels of the second section, and
- continuing this procedure until all of the sections are filled.

6. The method of claim 5 and in which the cover panels are closed after all of the sections are filled.

7. The method of claim 5 and in which the racks include means for interlocking superimposed racks in superposed relation, and including the steps of:
- loading the rack upon a truck bed,
- filling a similar rack with turkeys in the manner described, and
- interlocking the second rack in place overlying the first rack.

References Cited by the Examiner
UNITED STATES PATENTS

| | | | |
|---|---|---|---|
| 505,213 | 9/1893 | Barry | 217—56 |
| 611,753 | 10/1898 | Hoskins | 43—55 |
| 689,397 | 12/1901 | Hodges | 217—14 |
| 1,733,382 | 10/1929 | McCurdy | 119—17 |
| 1,839,673 | 1/1932 | Hartmann | 119—15 |
| 1,947,698 | 2/1934 | Corbin | 119—19 |
| 3,125,068 | 3/1964 | Hampton | 119—17 |
| 3,126,871 | 3/1964 | Byrnes | 119—18 X |

SAMUEL KOREN, *Primary Examiner.*
ALDRICH F. MEDBERY, *Examiner.*